United States Patent [19]
Arvanetakis

[11] 3,747,054
[45] July 17, 1973

[54] WIRELESS CONTROL OF MACHINES INSIDE A PIPELINE

[75] Inventor: Kiryako Arvanetakis, Houston, Tex.

[73] Assignee: Monroe X-Ray Company, Inc., Monroe, La.

[22] Filed: Jan. 5, 1970

[21] Appl. No.: 696

[52] U.S. Cl. ........... 340/15, 181/0.5 P, 181/0.5 SH, 250/52, 285/93
[51] Int. Cl. ...................... H04b 11/00, G01n 23/00
[58] Field of Search................................ 340/15, 8; 200/61.01; 250/52; 166/65, 250; 285/93; 246/187 A, 187 B

[56] References Cited
UNITED STATES PATENTS

| | | | |
|---|---|---|---|
| 3,514,756 | 5/1970 | Duteil .............................. | 246/63 A |
| 3,072,785 | 1/1963 | Hailes ............................. | 246/187 A |
| 3,363,096 | 1/1968 | Hughson et al. ................ | 246/187 B |
| 3,368,073 | 2/1968 | Baughman....................... | 246/187 B |
| 3,218,456 | 11/1965 | Matthews......................... | 246/187 A |
| 3,233,674 | 2/1966 | Leutwyler....................... | 166/65 X |
| 3,087,058 | 4/1963 | Arvanetakis et al............. | 250/52 |
| 3,349,366 | 10/1967 | Hanff................................ | 340/8 |
| 3,463,946 | 8/1969 | Zimmerman...................... | 340/17 |

*Primary Examiner*—Benjamin A. Borchelt
*Assistant Examiner*—H. A. Birmiel
*Attorney*—Hyer, Eickenroht, Thompson & Turner

[57] ABSTRACT

A control apparatus is disclosed, which includes an encoder-transmitter section having a plurality of fixed frequency oscillators generating a plurality of electrical control signals at different alternating current frequencies, and a transmitting transducer connected to receive said control signals and mounted on the outside of pipeline for converting said electrical control signals to mechanical signals. The mechanical signals are received inside the pipeline by a receiving transducer which converts them to electrical signals at the same alternating current frequencies as the original electrical signals. The output of the receiver transducer is connected to a plurality of parallel connected decoder circuits. Each encoder circuit provides an output signal in response to receipt of a alternating current signal of a certain frequency and this output signal may be conducted to one of the control mechanisms in a machine in the pipeline for operating the mechanism.

12 Claims, 9 Drawing Figures

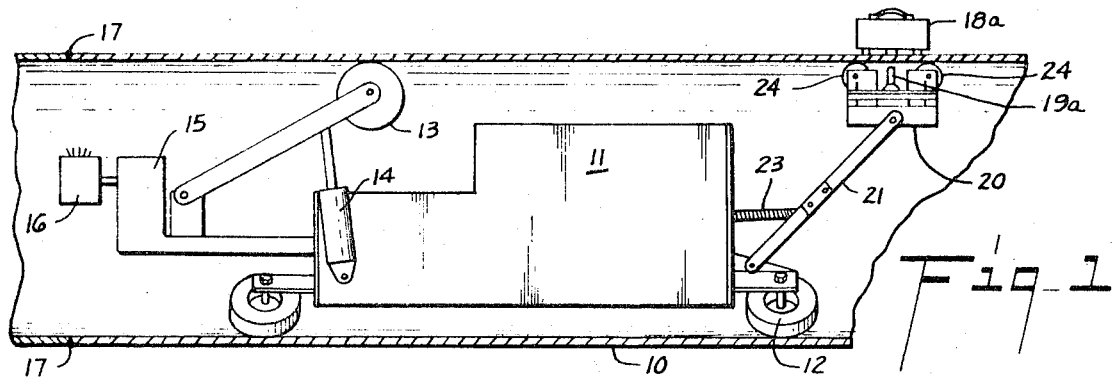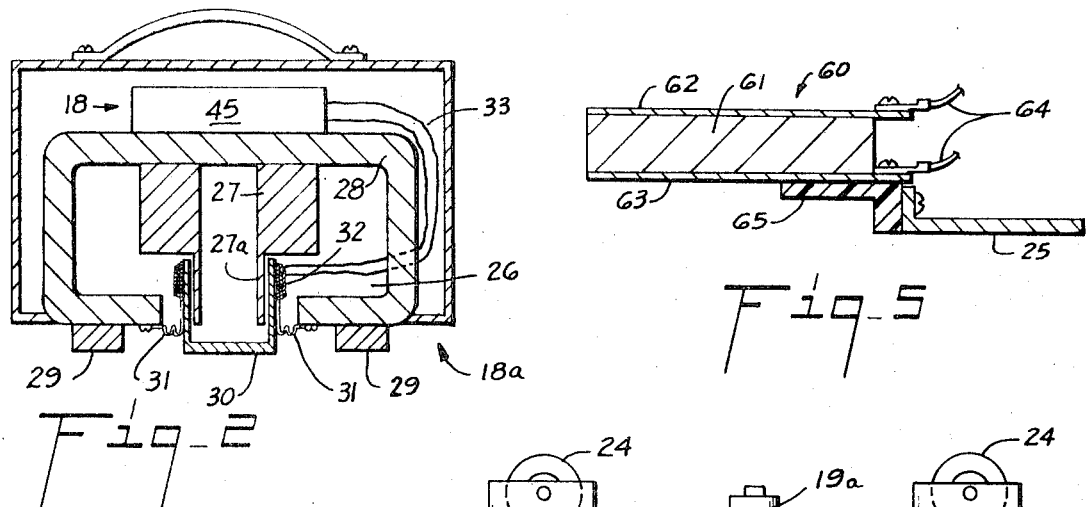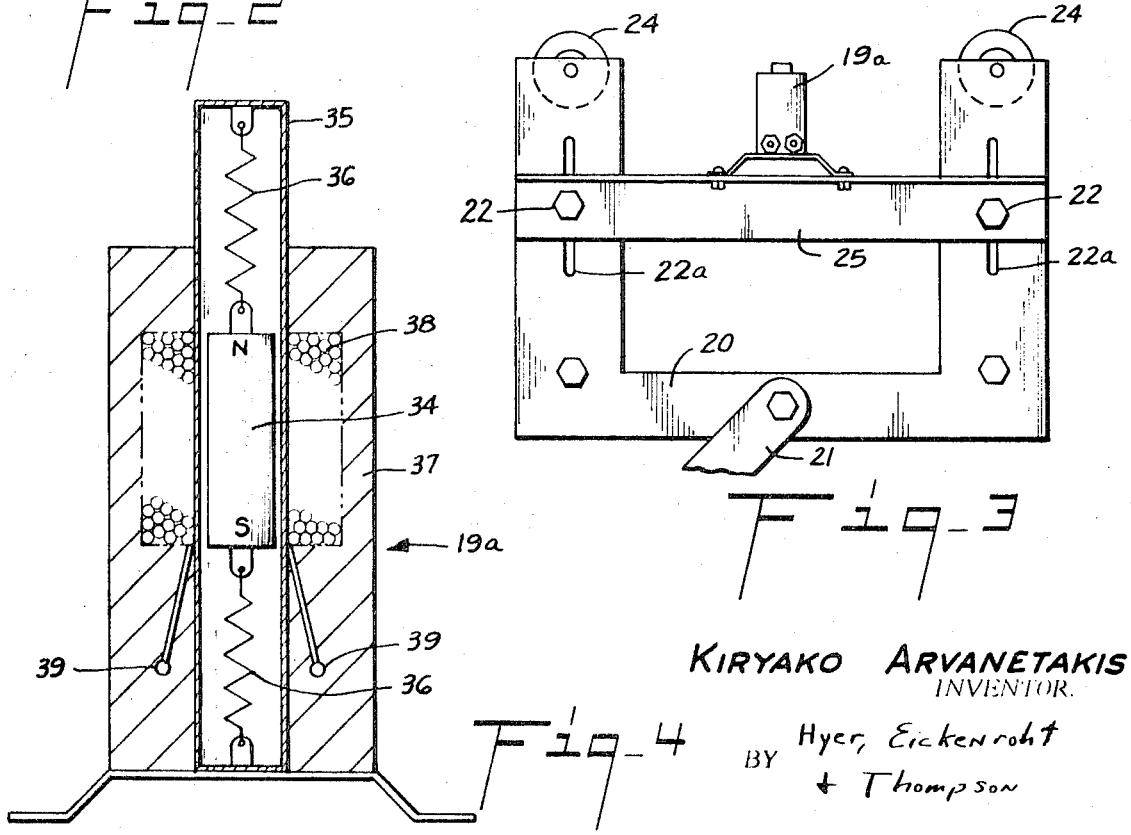

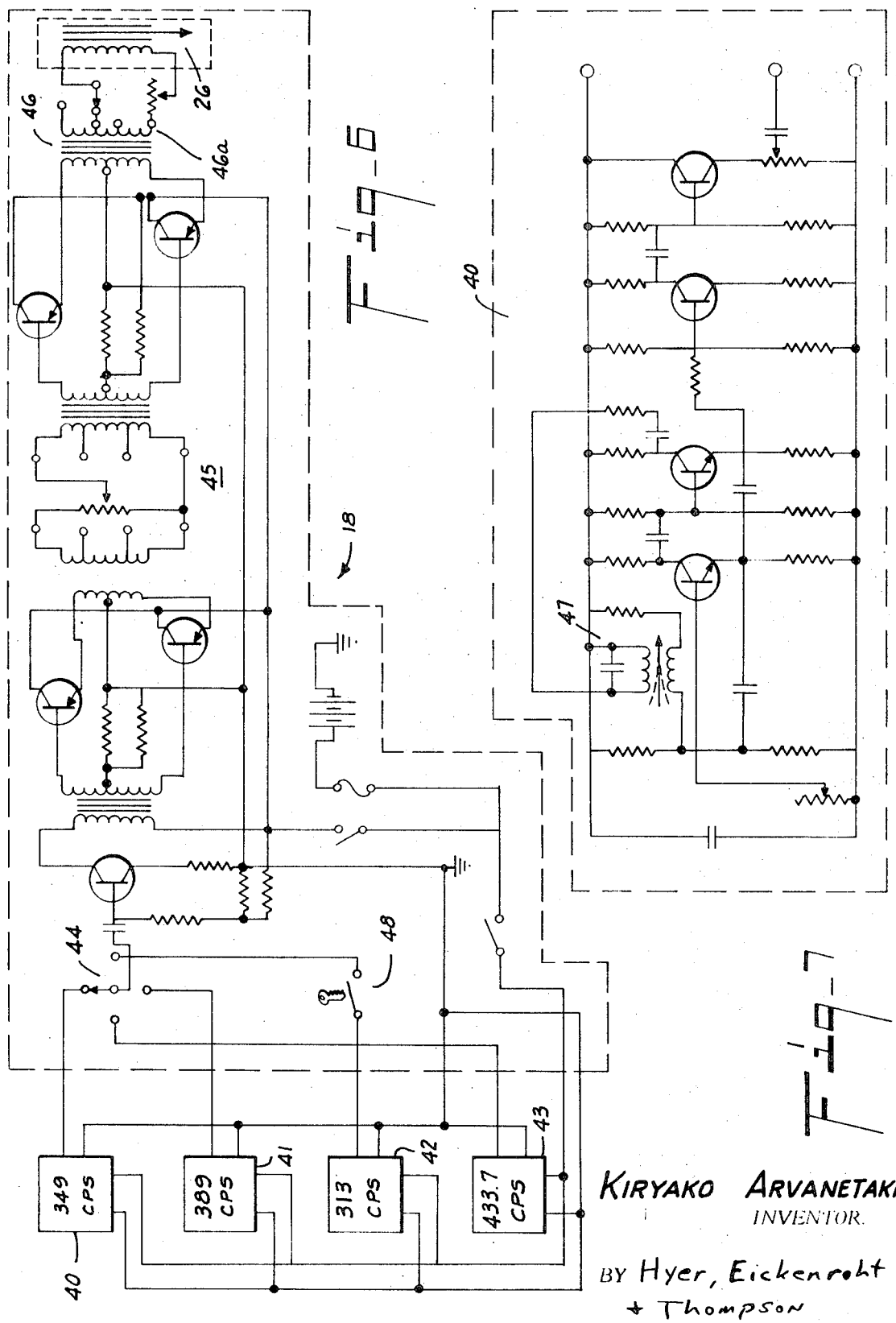

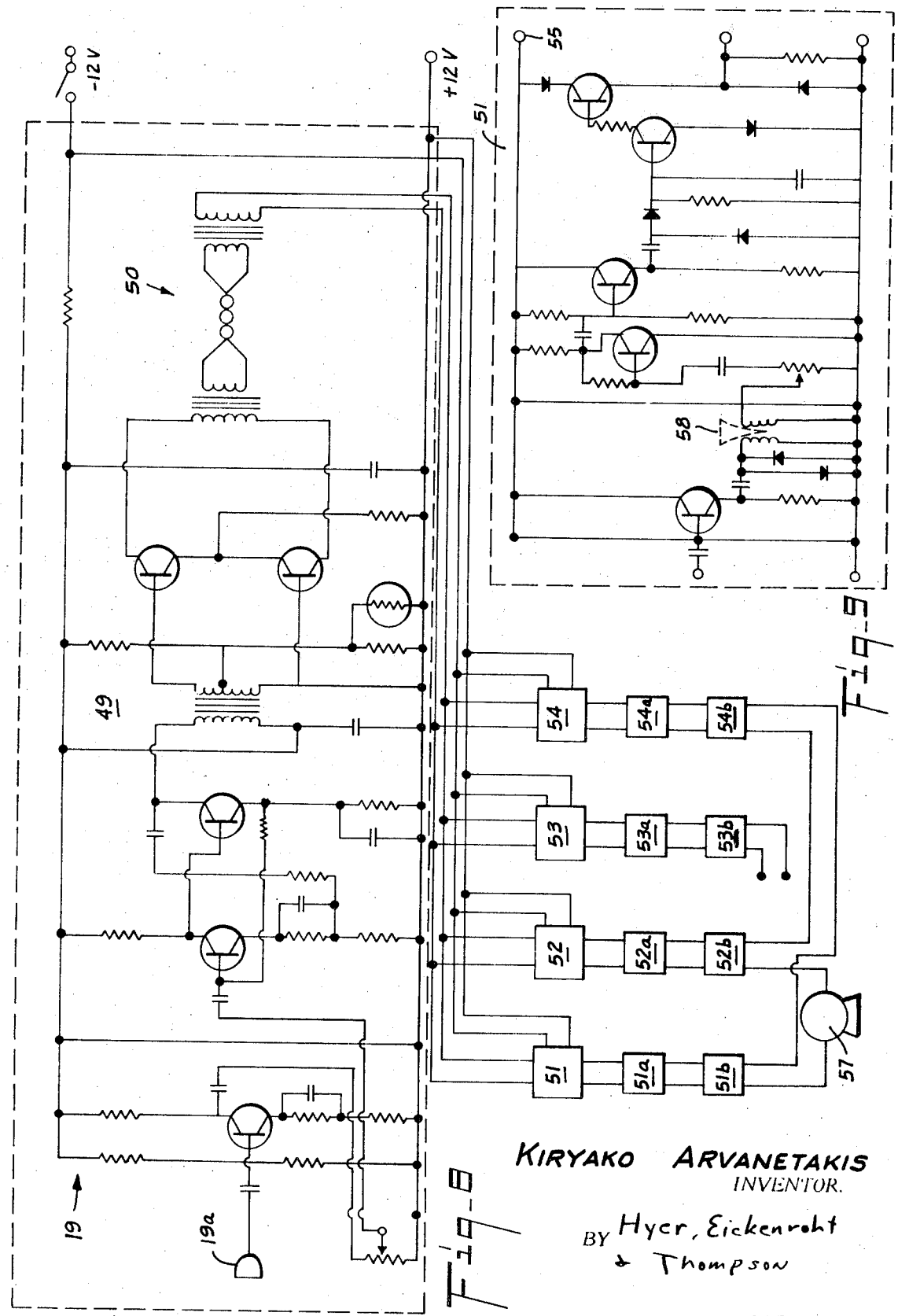

WIRELESS CONTROL OF MACHINES INSIDE A PIPELINE

This invention relates to an apparatus for controlling the operation of a machine inside a pipeline from a point outside the pipeline, and in one of its aspects to such an apparatus utilizing pre-selected audio frequency control signals.

There are many instances where large pipelines must be traversed by machines for cleaning or inspection purposes. The operation of such machines in a pipeline have generally been controlled by cable, which can be very cumbersome and expensive, particularly in long pipelines. In at least one instance a wireless control has been provided to control the operation of such a machine by use of a electromagnetic flux, but such a control requires large electro-magnets and a large and heavy power source, and is not easily portable to field locations where pipelines are generally inspected. Also, the use of electromagnetism is not a practical or efficient way to control such a machine where the precise control of a number of functions to be performed by the machine is required. An X-ray pipeline inspection machine is an example of a machine requiring such control.

X-ray pipeline inspection machines are generally moved along the inside of a pipeline and stopped at a precise point such as a joint where welds are inspected. During the inspection procedure a source of radioactive material must be moved from a shielded housing to a lens opening, exposure time must be regulated, and the radioactive source must be returned to its shielded housing at the end of exposure. The machine must then be moved along the pipeline to another joint or be backed out of the pipeline. The X-ray inspection machine is preferably self-powered by batteries so that bulky control cables are not necessary for power.

It is thus an object of this invention to provide a wireless control apparatus for controlling a self-powered machine in a pipeline.

It is another object of this invention to provide such an apparatus which stops the machine at a precise spot inside the pipeline in response to a control signal.

Another object of this invention is to provide such an apparatus which may be programmed by the operator to control the functions of the pipeline machine in any desired sequence.

Another object of this invention is to provide such an apparatus which is easily portable.

Another object of this invention is to provide such an apparatus which is relatively inexpensive to construct, is reliable, and can be used for long periods in field service.

These and other objects, advantages, and features of the invention are accomplished, in accordance with the illustrated embodiments of the invention, by apparatus including an encoder-transmitter for generating a plurality of different control signals in a pre-selected sequence, each signal being generated to control a different function of the pipeline machine. The control signals are conducted to a first or transmitting transducer which is mounted on the exterior of the pipeline so that each control signal is applied to the pipeline in said preselected sequence. A second or receiving transducer is located inside the pipeline and in an area where each of the control signals causes a corresponding electrical signal to be induced in the second transducer. The output of the second transducer is connected to a decoder-receiver which is connected to the pipeline machine and selectively controls the operation of the machine in response to receipt of the corresponding electrical signals.

The alternating current control signals are preferably generated as low frequency audio signals each at a different audio frequency. For this purpose the encoder includes a plurality of fixed frequency audio oscillators and the decoder includes a plurality of audio frequency selective circuits or decoder circuits each which provide an output signal only in response to receipt of an audio frequency signal of a pre-selected frequency.

In the preferred embodiment of this invention, the first transducer converts the audio frequency signals generated by each of the fixed frequency encoder-oscillators to mechanical vibrations which are applied by the transducer to the outer surface of the pipe. For this purpose the alternating current electrical signals are conducted to a coil mounted for reciprocating movement within a fixed magnetic field in the first transducer.

The second transducer preferably includes a permanent magnet mounted in a housing for reciprocating movement and an electrical coil in which an E.M.F. is generated in response to the movement of the permanent magnet. Thus when placed against the inner wall of the pipeline the permanent magnet may be caused to move at a pre-selected frequency by the mechanical vibrations applied by the first transducer to the outside of the pipeline, causing an alternating current electrical signal at the same frequency to be generated in the coil of the second transducer.

In the drawings, wherein like reference numerals are used throughout to designate like parts, and wherein a preferred embodiment of this invention is illustrated;

FIG. 1 is a view inside a pipeline illustrating a pipeline machine, the functions of which are controlled by the present invention, FIG. 2 is a cross sectional view of the transmitting transducer utilized in the present invention, FIG. 3 is a plan view of the frame on which the receiving transducer is mounted.

FIG. 4 is a cross sectional view of the receiving transducer employed with the present invention, FIG. 6 is a schematic diagram of the encoder-transmitter which generates control signals from outside the pipeline, FIG. 7 is a detailed schematic diagram of one of the encoder-oscillators of the encoder-transmitter, FIG. 8 is a schematic diagram of the receiver-decoder employed inside the pipeline to control the machine, and FIG. 9 is a detailed schematic diagram of one of the selective circuits of the receiver-decoder.

Referring to FIG. 1, a pipeline 10 is illustrated which includes a machine 11 mounted therein for longitudinal movement up and down the pipeline. In the embodiment illustrated the machine is an X-ray inspection machine which carries a radio-active source (not shown) in the pipeline for the purpose of radiographing welded seams. Inspection machine 11 operates as a crawler device and moves along pipeline 10 on wheels 12. Machine 11 also includes a upper wheel 13 which is forced against the upper surface of pipeline 10 by a hydraulic cylinder 14. A shielded housing 15 for storing the radioactive source, and a lens 16 are supported on one end (the forward end) of machine 11, to form a camera for performing the inspection. The radioactive source is normally stored in housing 15, however, when lens 16 is located in the area of a welded seam to be inspected, the radioactive source must be moved from shielded housing 15 into lens 16, and when the inspection is completed, the source must be moved back into the shielded housing 15. Also, the operator on the outside of the pipeline must be able to precisely locate the position of lens 16 inside the pipeline in order to perform the inspection operation, and the necessary control signals must be given to the machine to move it up and down the pipeline.

In the illustrated embodiment a forward control signal is generated for moving machine 11 in the direction of its forward end in pipeline 10, a reverse control signal is generated for moving it in the opposite direction in pipeline 10, a stop control signal is generated for stopping the movement of machine 11 in pipeline 10, and a source out control signal is generated for moving the source from shielded housing 15 to lens 16 when exposure is desired. Radioactive source is preferably mounted in shielded housing 15 so that it is always maintained inside the shielded housing except during the presence of the source out control signal. In this way a safety feature is provided because the operator knows that the radioactive source will always be in the stowed position in its shielded housing 15 until he initiates the source out command, thus limiting the likelihood of inadvertent exposure by personnel operating the machine.

The control signals are provided by an encoder-transmitter 18 including a transmitting transducer 26 mounted on the outer surface of the pipeline for generating the necessary control signals, and a receiver-decoder 19 including receiving transducer 19a mounted on the inside of the pipeline for receiving these control signals inside pipeline 10 and conducting them to machine 11.

As illustrated in FIG. 1, transmitter 18 is mounted on the outside of pipeline 10 at a fixed and known distance from a welded seam 17 to be inspected. Transducer 19a is carried by machine 11 as hereinafter described at this same distance from lens opening 16. Therefore control signals from transmitter 18 cause machine 11 to stop with transducer 19a at the same position in pipeline 10 as transmitter 18, but on the inside thereof, so that the opening of lens 16 is in the proper position for inspection of weld 17.

Transmitter 18 is preferably a self-contained, battery operated unit which can be carried by the operator and placed at the desired location on the outside of pipeline 10. Transmitter 18 includes an encoding means for generating coded signals for performing each desired function of machine 11, an amplifier for amplifying the coded signals, and a transmitting or first transducer for converting the amplified coded signals from electrical signals into mechanical vibrations which are then applied to the outer surface of pipeline 10.

Referring to FIG. 6 a detailed schematic is shown of the encoder-transmitter 18. Transmitter 18 and transducer 26 are preferably mounted in one box 18a which includes the necessary batteries and a handle for portable operation. Transmitter 18 includes a plurality of fixed frequency oscillators 40, 41, 42, and 43 and a rotary selector switch 44 connected to the outputs of each of the oscillators. Connected to the common terminal of selector 44 is a high gain amplifier 45 which is shown as a push-pull amplifier having a power output capacity of approximately 50 watts. The output of amplifier 45 is connected through a transformer 46 to transducer 26. The secondary of transformer 46 may include a number of different taps connected to a switch 46a so that the output power of amplifier 45 can be adjusted to a suitable level.

Each of the encoder modules 40 through 43 provide outputs at a different audio-frequency. In the embodiment illustrated oscillator 40 is set at 349 cycles per second, oscillator 41 at 389 cycles per second, oscillator 42 at 313 cycles per second, and oscillator 43 at 433.7 cycles per second. As illustrated in FIG. 7, showing a detailed schematic of oscillator 40, the frequency output of each oscillator 40-43 is controlled by a resonant vibrating reed 47. Each of the oscillators 40 through 43 includes a separate vibrating reed resonant at the fundamental frequency of the oscillator to provide a precise audio frequency source for each of the functions to be controlled.

In order to assure that oscillator 42 (the source out oscillator) is not turned on accidentally, its output may be connected to switch 44 through a key switch 48 so that switch 44 must be in the proper position and key switch 48 closed before the source out command signal is conducted to transducer 26. The key switch is preferably connected by a long cable to transmitter 18 so that the operator may actuate the source out command at some distance from pipeline 10 where exposure to radiation from the radioactive source would not be dangerous.

The details of transducer 26 are illustrated in FIG. 2. A cylindrical permanent magnet 27 is mounted in a soft iron yoke 28 preferably mounted in the bottom of the same box as transmitter 18. The bottom yoke includes a circular opening and a number of soft rubber pads 29 are connected to the bottom of yoke 28 about the opening to provide support pads for supporting yoke 28 on the outer surface of pipeline 10. A cylindrical drive element 30, made of aluminum or other non-ferrous material is mounted over a lower portion 27a of permanent magnet 27. Drive element 30 is supported from yoke 28 by flexible material 31 so that it is able to move relative to permanent magnet 27. The lower end of drive element 30, which is closed, extends from the opening in yoke 28 so that it may touch the outer surface of pipeline 10 when yoke 28 is supported by pads 29 on pipeline 10.

Drive element 30 is surrounded by a coil 32 which is connected by wires 33 to the output of transmitter 18. In this manner a drive signal from transmitter 18 is fed to the coil 32 and when the drive signal is an alternating current signal, coil 32 and drive element 30 will be displaced within the magnetic field of permanent magnet 27 at the frequency of the applied signal. This will cause drive element 30 to introduce an alternating signal of the same frequency as the applied signal to the wall of pipeline 10, except that a signal will be in the form of mechanical vibrations rather than electrical.

The mechanical vibrations imparted to pipeline 10 through drive element 30 are received on the interior of the pipeline by receiver 19 through transducer 19a. Transducer 19a is shown in detail in FIG. 4, and includes a permanent magnet 34 suspended in a tube or probe element 35 by means of springs 36. Probe element 35 is mounted in a plastic or epoxy housing 37 and is made of aluminum or other non-ferrous material.

A coil 38 is also mounted in housing 37 and encircles probe element 35 in the approximate area of where magnet 34 is disposed in element 35 so that movement of magnet 34 in element 35 will generate an electrical signal or E.M.F. in coil 38, Coil 38 is connected through terminals 39 to the input of receiver-decoder 19. The signals generated in coil 38 will be of the same alternating current frequencies as the signals applied to coil 32 in transducer 26.

As illustrated in FIGS. 1 and 4, transducer 19a is mounted on a cross bar 25 which is mounted by bolts 22 on a frame 20, bolts 22 being passed through slots 22a in frame 20. Frame 20 is pivotally connected to the upper end of an arm 21 which is pivotally connected on its lower end to machine 11. A spring 23 is connected between machine 11 and arm 21 so that frame 20 is forced against the upper interior wall of pipeline 20 under constant spring pressure when machine 11 is in pipeline 10. Frame 20 includes two steel rollers 24 to permit it to roll on the upper surface of pipeline 10. The bolt and slot mounting of cross bar 25 on frame 30 permits adjustment of the vertical position of transducer 19a so that it can be moved close to or against the upper surface of the interior of pipeline 10.

FIG. 5 shows an alternative form of the receiving transducer in which a quartz or ceramic crystal is used as the probe element. Crystal 60 includes a crystal element 61 sandwiched between two electrically conductive elements 62 and 63 each connected by wires 64 to the input of amplifier 49. Conductive element 63 is cemented to a mounting bracket 65 made of insulated material which is bolted to cross bar 25. When crystal 60 is placed in the vicinity of where transducer 26 is imparting vibrations to the wall of pipeline 10, an electrical signal will be generated by crystal element 61 at the frequency of the signal applied to transducer 26.

FIG. 8 shows a detailed schematic diagram of the receiver decoder 19 which is located in machine 11 and has its input connected to terminals 39 of transducer 19a. Receiver 19 includes a high gain amplifier 49 connected at its input to transducer 19a for receipt of control signals therefrom. The output of amplifier 49 includes an isolation transformer 50 which is provided to prevent the conduction of unwanted signals or noise from the output of amplifier 49 to the decoding units connected thereto.

Connected in parallel with the output of high gain amplifier 49, and to the secondary of transformer 50, are four decoder circuits 51, 52, 53, and 54. Each of these circuits comprise a selective circuit which provides an output signal of a precise alternating current frequency, and the frequency response of each circuit is controlled by a resonant reed 58. In the illustrated embodiment circuit 51 is set to provide such an output in response to receipt of an input signal at 349 cycles per second, circuit 52 to provide such an output upon receipt of an input signal of a 389 cycles per second, circuit 53 to provide such an output upon receipt of an input signal of 313 cycles per second, and circuit 54 to provide such an output upon receipt of an input signal of 433.7 cycles per second. The outputs of the decoder circuits 51 through 54 are each connected to the necessary relays for operating motors or other control mechanisms in machine 11. Thus, the output of circuit 51 is connected to a coil of a primary relay 51a, and the contacts of this relay are connected to operate a secondary relay operably connected through its contacts to a crawler motor 57 to control the operation of machine 11 in the forward direction. Relay 51a is a latching type so that once turned on by presence of an output in selective circuit 51 it will continue to connect motor 57 to a source of power until a stop signal is received.

Selective circuit 52 is similarly connected at its output to the coil of a primary relay 52a, which is in turn connected through its contacts to operate secondary relay 52b which is also connected to motor 57 to operate it in the reverse direction. Again, when an output is received from selective circuit 52 relay 52b will operably connect motor 57 to a source of power until receipt of a stop signal.

The stop signal is provided by receipt of an output from selective circuit 54 which is connected at its output to the coil of a primary relay 54a. Contacts of relay 54a are connected to a secondary relay 54b which is connected to open one of relays 51b or 52b to stop the operation of motor 57.

Selective circuit 53 provides the source out command signal and its output is connected to a primary relay 53a which is in turn connected to operate a secondary relay. The secondary relay connects a source out motor or other mechanism (not shown) to a source of power during pressure of the source out signal to move the source from shielded housing 15 to lens 16.

As can be readily understood from the above discussion, control signals of a desired alternating current frequency can be generated outside the pipeline and can be used through the combination of transducers 19a and 26 to generate control signals inside the pipeline of the same frequency for controlling desired functions. Any desired combination of different frequency signals can be used to control any number of desired functions of a machine inside the pipeline. In the embodiment illustrated the alternating current signals generated are in the audio frequency range and generally between 100 cycles per second and 1,000 cycles per second since signals at these frequencies can be easily generated at a precise known frequency, and the circuits generating them and receiving them can be made highly selective.

In operation machine 11 with the electronic circuitry of FIG. 8 is inserted into the pipeline 10. Transducer 19a riding on wheels 24 is held against the top inside wall of pipeline 10 by the tension of spring 23. The appropriate power switches are closed, energizing high-gain amplifier 49 and decoder modules 51, 52, 53, and 54 and completing the circuit to relays 51b, 52b, 53b, and 54b. Decoder modules 51–54 are now on standby position, ready to receive the control signals.

Encoder transmitter 18 and its associated components are now turned on by connection to the power source, except power amplifier 45. The resonant reeds 47 of the encoder oscillator are thus vibrating at their resonant frequency. Selector switch 44 is then set to the forward position and transducer 26 is placed on the outside wall of the pipe opposite the location of receiving transducer 19a located inside pipeline 10. Power amplifier 45 is now energized permitting the signal frequency of 349 cycles per second from encoder oscillator 40 to be amplified and conducted to transducer 26. The audio frequency signal is then imparted from the transducer 26 into the wall of pipeline 10 and is then received or picked up by receiving transducer 19a, amplified by high-gain amplifier 49 and then filtered through isolation transformer 50. The signal from isolation transformer 35 is then applied to the signal inputs of all the decoder selective circuits 51-54 simultaneously. The appropriate resonant reed 58 of decoder module 51 will begin to resonate at 349 per second. Decoder selective circuits 52, 53, and 54 will remain unaffected since their resonant reeds 58 will not vibrate or resonate at the 349 cycle per second frequency. An output from circuit 51 causes primary relay 51a to close and energize its appropriate secondary relay 51b to apply electrical power to motor 57 and move machine 11 forward. The operator then moves ahead of machine 11 now moving pipeline 10, and places transducer 26 on the top side of the outside wall of the pipeline at a distance from a welded seam to be inspected equal to the distance from receiver transducer 19a to lens 16. The operator then turns switch 44 to the stop position causing a signal of 433.7 cycles per second to be applied to pipeline 10. Transducer 19a will then approach the area under the transducer 26 and will pickup the stop signal of 433.7 cycles per second, which will be amplified and fed to all of the decoder selective circuits 51-54 simultaneously. Only the appropriate decoder module 54 will respond to this signal since it has the only reed that resonates at the specific frequency of 433.7 cycles per second. Decoder selective circuit 54 will then provide an output to close primary relay 54a thereby closing secondary relay 54 which opens the circuit providing power to motor 57. Machine 11 is thus stopped and will remain static until it receives another control signal.

In order to make an radiographic exposure, the operator will leave transducer 26 on the outside wall of the pipe and step away from the location of the crawler unit to a safe distance in order to be out of the field of radiation. He then will turn the selector key 48 on which completes the signal path from the source-out encoder oscillator to the input of the power amplifier. The signal frequency of the source-out encoder oscillator is 313 cycles per second, and it will be conducted to the appropriate selective circuit 53 in receiver 49, and corresponding relays 53a and 53b, to move the source out of housing 15 into lens 16. When the required exposure is completed key 48 is turned off and the source automatically returns to housing 15.

Switch 44 may now be placed in the forward or reverse position to move machine 11 to a new location in pipeline 10.

From the foregoing description of one embodiment of this invention, by way of example, it will be seen that this invention is one well adapted to attain all of the ends and objects hereinabove set forth, together with other advantages which are obvious and which are inherent to the apparatus and structure.

The invention having been described what is claimed is:

1. Apparatus for controlling the operation of a pipeline inspection machine traversing inside a pipeline from a point outside the pipeline, wherein said machine includes an inspection head located thereon, said apparatus comprising, in combination: a portable control transmitter adapted to be mounted on the outside of said pipeline at a fixed distance from a portion of said pipeline to be inspected, said transmitter including encoding means for generating a plurality of different control signals in a pre-selected sequence, each such signal being generated to control at least one different function of said machine; first transducer means connected to said encoding means for receipt of such signals for applying each of said control signals from the outside diameter of the pipeline through its wall to the inside diameter in said pre-selected sequence; a control receiver mounted on said pipeline inspection machine and including a second transducer means adapted to be mounted on said machine at substantially said fixed distance from said inspection head and adjacent said inside diameter to be responsive to each of said control signals when in substantial alignment with said first transducer means to cause a corresponding electrical signal to be induced in said second transducer means; decoding means connected to said second transducer means for decoding the signals from said second transducer means to provide a sequence of distinctive output signals in response to receipt of said electrical signals from said second transducer means; and switch means connected to said decoding means and adapted to be connected to control the application of power to said pipeline inspection machine, said switch means including first means responsive to one of said distinctive output signals for causing movement of said machine in a pipeline, second means responsive to another of said distinctive output signals for causing the stopping of said machine with said first and second transducer means in substantial alignment; and third means responsive to another of said distinctive output signals for causing the inspection function of said machine to be accomplished.

2. The apparatus of claim 1 wherein said machine to be controlled is an X-ray pipeline inspection apparatus including an X-ray camera located thereon, and said apparatus further includes means for mounting said second transducer means on said machine and at a known distance from said camera, and means for mounting said first transducer means on the exterior of said pipeline and at said known distance from a portion of said pipeline to be inspected.

3. The apparatus of claim 1 wherein each of said different control signals is at a different alternating current frequency.

4. The apparatus of claim 3 wherein said encoder includes a plurality of fixed frequency oscillators and said decoder includes a plurality of selective circuits, each of said circuits responsive to an electrical signal at one of said fixed frequencies for controlling at least one function of said machine.

5. The apparatus of claim 4 wherein each of said fixed frequency oscillators is in the audio frequency range.

6. The apparatus of claim 3 wherein said first transducer includes means providing a magnetic field of fixed intensity, non-ferromagnetic means mounted for reciprocating movement in said magnetic field and adapted to contact the outer surface of said pipeline, and means connected to said non-ferromagnetic means and responding to one of said control signals and said magnetic field to cause said non-ferromagnetic means to impart vibrations to said pipeline at one of said different alternating current frequencies.

7. The apparatus of claim 3 wherein said second transducer means includes a means providing a fixed magnetic field, said last mentioned means being mounted for reciprocating movement whereby vibrations to said pipeline at one of said different frequencies causes movement of said last mentioned means at such frequency, and means providing an electrical output in response to such movement and at said different frequency.

8. The apparatus of claim 6 wherein said second transducer means includes a means providing a fixed magnetic field, said last mentioned means being mounted for reciprocating movement whereby vibrations to said pipeline at one of said different frequencies causes movement of said last mentioned means at such frequency, and means providing an electrical output in response to such movement and at said different frequency.

9. The apparatus of claim 1 further including an amplifier connected between said encoding means and said first transducer, and wherein said encoding means includes a plurality of audio frequency oscillators each having a fixed frequency output signal and means for selecting one of said fixed frequency output signals and conducting it to said amplifier.

10. The apparatus of claim 9 further including an amplifier connected between said second transducer means and said decoding means, and wherein said decoding means includes a plurality of selective circuits, each of selective circuits responsive to an electrical signal at a pre-selected audio frequency to provide an output signal for controlling at least one function of said machine.

11. A method of controlling a pipeline X-ray inspection machine movable inside a pipeline between various locations therein, from various pre-selected points outside the pipeline comprising the steps of:

a. placing a self-propelled pipeline X-ray inspection machine inside a pipeline, said X-ray machine including an X-ray camera, and a receiving transducer mounted therein at a known distance from said camera, b. activating said machine to propel itself down said pipeline, c. placing an apparatus containing a signal generating means and a transmitting transducer on the outside surface of said pipeline at a distance from a spot to be X-rayed substantially equal to the distance between said receiving transducer and said camera so that when said receiving transducer means is directly under said transmitting transducer the X-ray camera is adjacent the spot to be X-rayed, d. sending a first control signal by said transmitting transducer on the outside of said pipeline to stop said machine with said camera adjacent said spot to be X-rayed, e. sending a second control signal by said transmitting transducer to cause said camera to be actuated, and f. sending a third control signal by said transmitting transducer to cause said pipeline machine to propel itself to a new location.

12. The method of claim 11 wherein said X-ray camera is automatically deactivated upon termination of said second control signal.

* * * * *